United States Patent [19]
Shiell et al.

[11] Patent Number: 6,032,225
[45] Date of Patent: Feb. 29, 2000

[54] MICROPROCESSOR SYSTEM WITH BURSTABLE, NON-CACHEABLE MEMORY ACCESS SUPPORT

[75] Inventors: Jonathan H. Shiell, Plano, Tex.; Ashwini K. Nanda, Yorktown Heights, N.Y.; Ian Chen, Houston; Steven D. Krueger, Dallas, both of Tex.

[73] Assignee: Texas Instruments Incorporated, Dallas, Tex.

[21] Appl. No.: 08/769,194

[22] Filed: Dec. 18, 1996

[51] Int. Cl.[7] .................................................. G06F 12/00
[52] U.S. Cl. .......................... 711/117; 711/118; 711/157; 711/135; 395/307; 395/800.34; 365/189.02
[58] Field of Search ..................................... 711/117, 118, 711/3, 5, 157, 135, 151, 133, 159, 158; 395/307, 800.34; 365/189.02

[56] References Cited

U.S. PATENT DOCUMENTS

| | | | |
|---|---|---|---|
| 5,384,906 | 1/1995 | Horst | 395/553 |
| 5,566,324 | 10/1996 | Kass | 711/160 |
| 5,617,556 | 4/1997 | Baumgartner et al. | 711/141 |
| 5,664,148 | 9/1997 | Mulla et al. | 771/138 |
| 5,732,241 | 3/1998 | Chan | 711/131 |

*Primary Examiner*—Tod R. Swann
*Assistant Examiner*—Mehdi Namazi
*Attorney, Agent, or Firm*—Robert D. Marshall, Jr.; Gerald E. Laws; Richard L. Donaldson

[57] ABSTRACT

A microprocessor-based system (2) is disclosed, based on an x86-architecture microprocessor (5). The system includes a memory address space (30) and a input/output address space (40), where input/output operations are performed in an I/O mapped manner. According to a first embodiment of the invention, burstable access is performed to areas of the main memory (32) which are blocked from cache access, by the microprocessor (5) asserting the cache request signal (CACHE#) in combination with the control signal (M/IO#) indicating that an I/O operation is requested. The memory controller (10) interprets this combination as a burst request to the non-cacheable memory location (32), indicates the grant of burst access by asserting the cache acknowledge control signal (KEN#), and the burst memory access is then effected. According to a second embodiment of the invention, burst access to non-cacheable memory space (32) is acknowledged by the memory controller (60) by way of a burst acknowledge signal (BEN#) that is separate from the cache acknowledgment signal (KEN#).

17 Claims, 5 Drawing Sheets

MICROPROCESSOR SYSTEM WITH BURSTABLE, NON-CACHEABLE MEMORY ACCESS SUPPORT

TECHNICAL FIELD OF THE INVENTION

This invention is in the field of microprocessor-based data processing systems, and is more specifically directed to memory buffer management schemes therein.

BACKGROUND OF THE INVENTION

As is evident in the field, modern high performance data processing systems are conventionally implemented using single-chip microprocessors as the central processing units (CPU), and using semiconductor random-access memory (RAM) as main system memory. The main memory is generally implemented in the form of dynamic RAM (DRAM) devices, which are of high density and low cost-per-bit; however, the access and cycle times of conventional DRAM memory are relatively slow, and are not able to keep up with the clock rates of modern microprocessors.

Conventional microprocessor-based data processing systems have addressed the performance limitations of main memory access, while still obtaining the low-cost benefit of high-density DRAM, through the use of cache memories. Cache memories are typically small blocks of high speed static RAM (SRAM), either on-chip with the microprocessor or off-chip (or both), for storing the contents of memory locations that are likely to be accessed in the near future. Typically, cache memory will store the contents of memory locations that are near neighbors to a memory location that was recently accessed; because microprocessors often access memory in a sequential fashion, it is likely that successive memory accesses in successive cycles will access memory addresses that are very close to one another in the memory space. Accordingly, by storing the neighboring memory location contents in a cache, a good portion of the memory accesses may be made by the microprocessor to cache, rather than to main memory. The overall performance of the system will thus be improved through the implementation of cache memory. Some modern microprocessors include multiple levels of cache memory, with the capacity of the cache increasing (and its speed decreasing) with each successive level, to optimize performance. Intelligent cache design and implementation can greatly improve system performance by minimizing accesses to main DRAM memory.

Another approach toward improving memory access performance in microprocessor-based systems is the use of special memory access cycles, commonly referred to as "burst" access cycles. Burst memory access cycles are used, in the operation of the memory devices, to provide access to a series of memory locations. Typically, the burst access is effected by way of a memory controller chip placed between the microprocessor and main memory, and operates in response to the address information and control signals presented by the microprocessor. Burst cycles are highly effective in improving the performance of memory accesses. For example, in a modern system having an eight-byte bus, a burst cycle can access thirty-two bytes of memory with the presentation of a single memory address in as few as five bus cycles (2-1-1-1), when using a best case cache. Burst access is also highly efficient using page mode DRAM, in which a thirty-two byte access may be performed in a bus cycle sequence of 8-3-3-3 (totaling seventeen bus cycles), and using special DRAM functions such as Early Data Out (EDO) and synchronous DRAM, in which thirty-two byte burst accesses may be accomplished, in the best case, with a bus cycle sequence of 6-1-1-1 (totaling nine bus cycles). This is a drastic improvement over the non-burst case in which access of a 32-byte line requires 64 cycles when accessed as a group of eight separate 4 byte reads (considering that non-burst accesses are generally not longer than 4 bytes). As such, burst mode memory access is typically twice to six times as fast as non-burst cycles.

In microprocessors utilizing the well-known "x86" architecture, including the so-called "Pentium-class" microprocessors (referring to microprocessors having functionality and instruction set compatibility with PENTIUM microprocessors available from Intel Corporation), burst memory access are linked to cache operations. In other words, in these x86-architecture microprocessors, burst memory operations are performed only in connection with cache line fill operations (reads from memory) and cache write-back operations (writes to memory). Given the cache architecture of these microprocessors, where most data and instruction retrieval is accomplished by way of cache memory, the performance provided by performing burst memory accesses for cache operations is quite high.

Caching typically works quite well for "true" memory locations, to and from which only the microprocessor writes and reads data using conventional memory access operations, because the microprocessor can ensure that its cache copy of the memory location matches the copy in main memory. So long as the cache and main memory copies of the same memory locations are the same, reading of the cache copy instead of the main memory copy will have no side effects. However, certain memory locations, such as those containing the status of an I/O device or those portions of the screen buffer that may be changed by a graphics accelerator, are volatile to the extent that cache copies of these memory locations would be frequently out-of-date. The reading of a cache copy of these volatile memory locations, in lieu of the main memory locations, could have significant side effects in system operation. Accordingly, accesses by the microprocessor to these volatile locations are blocked from being "cacheable" (i.e., from being stored in cache memory) in conventional IBM PC architecture systems, typically by the operation of a memory controller.

For example, the memory mapped register is generally a blocked area in the cacheable access sense, despite being accessed via conventional memory access, because the memory mapped register is often polled to detect changes in device status, responsive to which certain control functions are effected. If the memory-mapped register were cached, changes in device status would be reflected in the main memory copy of the memory-mapped register but not in the cached copy; periodic polling of the memory-mapped register would read the cache copy only, and would therefore not detect the sought-for change in device status, effectively bringing control to a standstill. By way of another example, the caching of non-memory devices such as memory-mapped I/O functions may cause additional side effects for those types of I/O devices which change state in response to a read operation on the bus, since reads of on-chip cache memory do not appear as bus cycles. Write-back caching also presents side effects for these non-memory locations, as the cache could contain a more up-to-date copy than main memory; since writes to write-back cache do not appear on the bus, the caching of these locations would appear to reorder writes performed on the bus.

Another example of a memory area that is volatile and therefore typically blocked from cacheable access is video memory, which is logically within the memory map of the microprocessor and physically located either within or separate from main memory (such as in a graphics adaptor). Video memory is often under the control of a device other than the microprocessor, such as a graphics processor or graphics adaptor, and is therefore not suitable for cacheable access by the main microprocessor as its contents are frequently changed outside of the control of the microprocessor. If a portion of video memory were to be stored in the microprocessor cache, the cache contents would likely be invalid for subsequent accesses because of the changes made by the graphics processor.

According to conventional x86-architecture microprocessors, therefore, burstable memory accesses are linked to the cacheability of the memory location to be accessed. For example, the PENTIUM microprocessor requests a burstable memory access by asserting a control signal at terminal CACHE# (the # indicating that the signal is active at a low logic level) during an access to memory (indicated by the microprocessor presenting a high logic level at terminal M/IO#). Responsive to this request, the memory controller determines if the memory address presented by the microprocessor is in a cacheable area of the memory space and, if so, asserts the KEN# input to the microprocessor and effects the burst access. According to this conventional implementation, if the microprocessor requests a burstable access to an area of memory that is blocked from cacheable access, the memory controller will not effect a burstable access, and will indicate the same by deasserting KEN#. Single transfer access to the desired memory location will then proceed.

SUMMARY OF THE INVENTION

The invention may be implemented in a data processing system based on a microprocessor, such as a Pentium-class microprocessor, which has an input/output address space with common address values as locations in memory address space, selectable by way of a memory/input-output select control signal. The microprocessor also has a control output which indicates a cache access request to the memory. According to the present invention, the microprocessor requests burstable access to non-cacheable memory areas by asserting the cache request signal in combination with presentation of a memory address and selection of input-output access. The system includes a memory controller that interprets the combination of the cache request signal and input-output access selection as a request for a burstable access to memory; the memory controller then effects the burstable access, and indicates the same to the microprocessor by way of a control signal.

It is an object of the present invention to provide a microprocessor-based data processing system that provides burstable access to memory locations that are not cacheable.

It is a further object of the present invention to provide such access for both reads and writes.

Other objects and advantages of the present invention will be apparent to those of ordinary skill in the art having reference to the following specification together with its drawings.

DETAILED DESCRIPTION OF THE PREFERRED EMBODIMENTS

Figure 1:
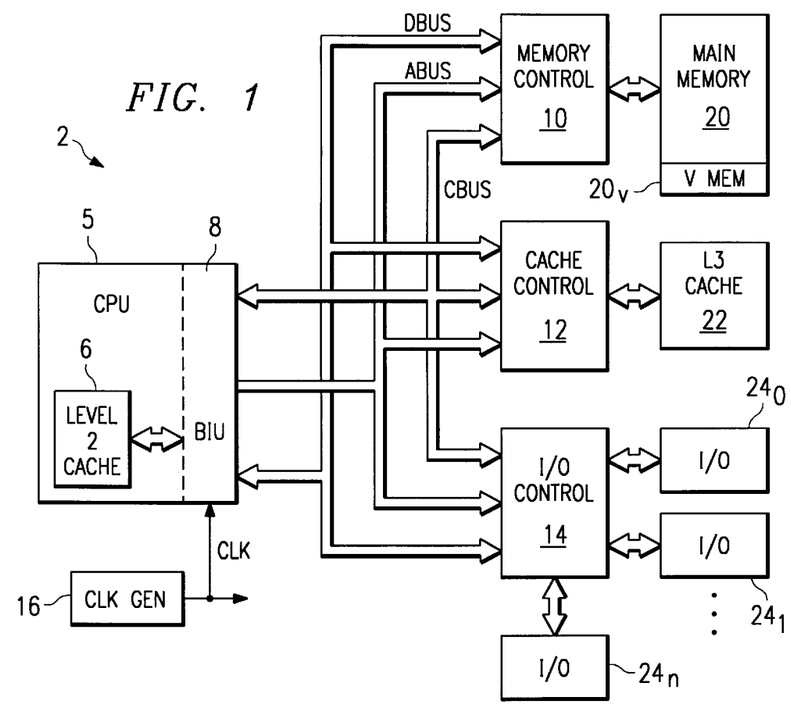
FIG. 1 is an electrical diagram, in block form, of a data processing system according to the preferred embodiment of the present invention.

Referring first to FIG. 1, an exemplary microprocessor-based system 2 into which a first preferred embodiment of the present invention is implemented will now be described in detail. As shown in FIG. 1, system 2 includes central processing unit (CPU) 5 which, in this embodiment of the invention, is a microprocessor of the well-known "x86-architecture", and is preferably a Pentium-class microprocessor. CPU 5 includes, as a portion thereof, bus interface unit (BIU) 8. BIU 8 is circuitry within CPU 5 which serves to control and effect communication between CPU 5 and the remainder of system 2. In this embodiment of the invention, BIU 8 of CPU 5 is connected to a bus consisting of address bus ABUS, data bus DBUS, and control bus CBUS. As is conventional in the art, address bus ABUS is a bus upon which CPU 5 presents a binary address to access other elements of system 2, data bus DBUS is a bus for the communication of digital data between CPU 5 and the other system elements, and control bus CBUS is a bus by way of which control signals are communicated among the elements of system 2.

In system 2 of FIG. 1, various peripheral elements are connected to buses ABUS, DBUS, CBUS, by way of associated controllers, to effect usual system functions. Main memory 20 of system 2 is coupled to buses ABUS, DBUS, CBUS by memory controller 10; as such, memory controller 10 receives address values and control signals from CPU 5, and presents corresponding control signals to main memory 20 to effect the desired operation, which generally involves the communication of data to or from CPU 5 on data bus DBUS. System 2 also includes level 3 cache memory 22, which is connected to cache controller 12 in the conventional manner; cache controller 12 is connected to buses ABUS, DBUS, CBUS, to control the communication of data between CPU 5 and level 3 cache memory 22. In this example, level 3 cache memory 22 is a third level cache memory for system 2, with level 1 and level 2 cache memory present within CPU 5 (level 2 cache 6 being shown in FIG. 1). System 2 also includes I/O controller 14 which is connected to CPU 5 via buses ABUS, DBUS, CBUS, and which is also connected to several input/output devices 24o to 24n. Input/output devices 24o to 24n may include typical input and output peripherals in system 2, such as a video monitor, a keyboard and pointing device, disk drive subsystems, and the like. Controllers 10, 12, 14 are typically implemented by way of a so-called "chip set" that is designed to operate in conjunction with CPU 5. System 2 further includes clock generator circuit 16, which generates a periodic clock signal on line CLK for presentation to each of the elements of system 2, including CPU 5 via BIU 8, and from which internal clock signals are generated within each of the various system elements. Accordingly, it is contemplated that system 2 corresponds to a typical modern computer, such as of the desktop workstation or portable notebook type, in which computer programs are stored within disk storage (represented by one of input/output devices 24o to 24n), and downloaded to main memory 20 for operation.

Memory accesses are accomplished by the presentation of an address value on bus ABUS by CPU 5 in combination with the appropriate control signals on control bus CBUS (including a read/write selection signal); memory controller 10 will, in turn, present the appropriate control signals to main memory 20 to access the desired location. In this example, a portion 20v of main memory 20 is video memory, which may be independently accessed by the one of I/O devices 24o to 24n that is the graphics adaptor (or controller), either by way of buses ABUS, DBUS, CBUS or by way of a second bus (not shown); alternatively, video memory 20v could be implemented as its own device on the bus, as in the case of a PCI video card. Under the control of memory controller 10, which is generally accomplished by way of a handshaking protocol between it and CPU 5 via control bus CBUS, CPU 5 either presents data on data bus DBUS (in a memory write) or receives data from data bus DBUS (in a memory read).

As illustrated in FIG. 1, both memory and input/output traffic occurs by way of the same buses, namely address bus ABUS, data bus DBUS, and control bus CBUS. Accordingly, in this embodiment of the invention as is typical for x86-architecture microprocessor-based systems, input/output accesses are performed in a similar fashion as memory accesses described above, with CPU 5 presenting an address on address bus ABUS in combination with the appropriate control signals on line CBUS. For an I/O operation, the address on address bus ABUS corresponds to a particular one of input/output devices 24o to 24n. Under the control of I/O controller 14, data is then communicated from CPU 5 to the selected I/O device 24i via data bus DBUS (for an output operation) or from the selected I/O device 24i to CPU 4 via data bus DBUS (for an input operation).

Figure 2:
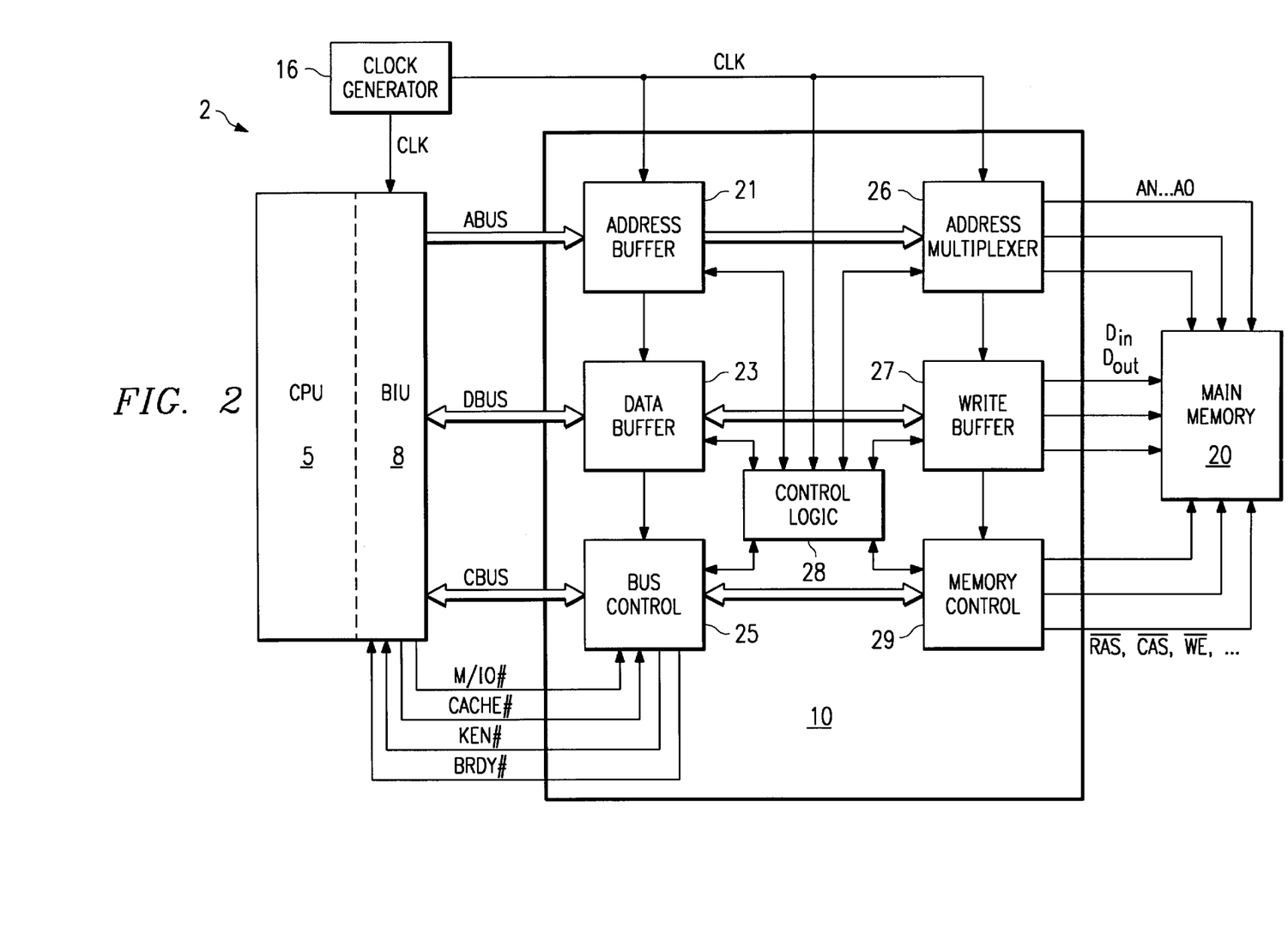
FIG. 2 is an electrical diagram, in block form, of the memory and input/output controller of the system of FIG. 1 according to a first embodiment of the invention.

Referring now to FIG. 2, the construction and operation of memory controller 10 according to the first embodiment of the invention, and in conjunction with CPU 5 and main memory 20, will now be described in detail. As shown in FIG. 2, BIU 8 of CPU 5 communicates with memory controller 10 by way of address bus ABUS, data bus DBUS, and control bus CBUS, which are connected to specified terminals of CPU 5. The terminals of CPU 5 are its external connectors, which may be in the form of pins (as in pin-grid-array packages), solder balls, package leads, bond pads (when in chip form), or any other conventional type of external connection for integrated circuit packages. As known in the art, the terminals of CPU 5 are conventionally referred to by pin or signal names; for purposes of this description, bus lines connected to terminals of CPU 5 will have the same name as their corresponding terminal. As shown in FIG. 2, control bus CBUS includes lines corresponding to terminals of CPU 5 including, in this example conventional Pentium-class microprocessor terminals such as memory/IO select M/IO#, cache request CACHE#, burst ready BRDY# and cache enable KEN#. Other conventional Pentium-class terminals used in effecting memory accesses (but not shown in FIG. 2), include byte enable signals BE7#-BE0, address status signal ADS#, data/control select D/C#, write/read select W/R#, write-back/write-through signal WB/WT#, and the like. Clock generator 16 provides a clock signal on line CLK to CPU 5 (via BIU 8) and to memory controller 10.

Memory controller 10 includes several functional blocks therein for providing communication between CPU 5 and main memory 20. These blocks are shown functionally in FIG. 2, as it is contemplated that one of ordinary skill in the art will fully understand the construction and operation of memory controller 10 from a functional description. As is conventional in the art, address buffer 21 receives the memory address from CPU 5 on address bus ABUS, and forwards the same to address multiplexer 26 for presentation to main memory 20 on address lines AN through AO. Data buffer 23 in memory controller 10 similarly receives data from CPU 5 on data bus DBUS, and forwards the same, in write operations, to write buffer 27 which is in communication with main memory 20 via data lines Din; this path is bidirectional, however, and as such write buffer 27 may receive data from main memory 20 on lines Dout, and forward this data to data buffer 23 for presentation to CPU 5 in memory read operations.

Control of communication between CPU 5 and main memory 20 is effected by bus control circuit 25, connected to control bus CBUS and memory control circuit 29; in addition, memory controller 10 also includes control logic 28, which controls the internal operation of memory controller 10. In particular, bus control circuit 25 receives control signals from CPU 5 on control bus CBUS, including signals M/IO# and CACHE# and, in response to a request for memory access, instructs memory control circuit 29 to issue the appropriate conventional DRAM control and timing signals to main memory 20 to effect the memory access, such signals including row address strobe (RAS#), column address strobe (CAS#), write enable (WE#). In addition, bus control circuit 25 issues control signals to CPU 5 indicating the status of the memory access, such control signals include cache enable signal KEN#, as well as burst ready signal BRDY#, which is of particular importance for burst accesses as will be described hereinbelow.

Control logic 28 of memory controller 10 also preferably includes programmable registers for controlling the operation of memory controller 10, including registers that define non-cacheable locations of main memory 20. In response to each memory access requested by CPU 5, control logic 28 will examine these registers to determine whether the desired memory address, as presented on address bus ABUS, is in a non-cacheable area of the memory address space. As is known in the art, memory controller 10 asserts line KEN# to indicate to CPU 5 that the desired memory access is cacheable, and deasserts line KEN# if the desired memory address is in a non-cacheable area.

According to the prior art, as described hereinabove relative to the Background of the Invention, burstable memory accesses were available only for memory addresses that were not in a non-cacheable area. In prior art microprocessor implementations therefore, line KEN# would be deasserted responsive to a request for memory access made to a non-cacheable area; in addition, terminal BRDY# of the microprocessor would be asserted only for the duration of a single transfer operation (read or write) made to a non-cacheable area of memory, rather than for multiple bus cycles as would be the case for a burst access.

Figure 3:
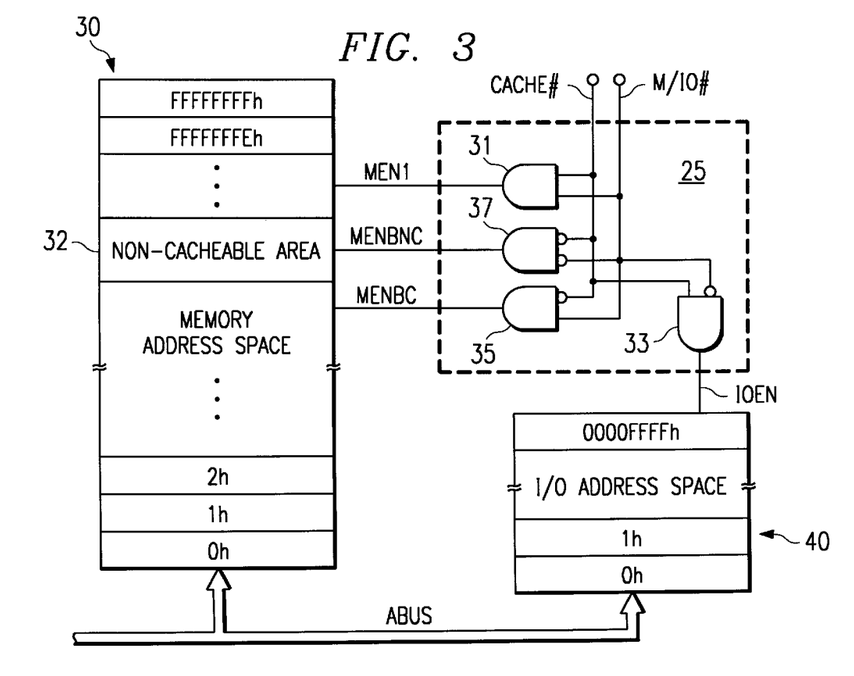
FIG. 3 is a schematic diagram of the memory address space and input/output address space of the data processing system of FIG. 1, schematically illustrating the conditions under which each address space is accessed according to a first preferred embodiment of the invention..

FIG. 3 schematically illustrates the respective address spaces in system 2 according to this embodiment of the invention. In exemplary system 2, as is conventional for Pentium-class microprocessors, a 4 Gbyte memory address space 30 (memory addresses from 0000 0000h to FFFF FFFFh) and a 64kbyte I/O address space 40 (memory addresses from 0000 0000h to 0000 FFFFh) are provided. Also as is typical for Pentium-class microprocessors, including CPU 5, memory address space 30 and I/O address space 40 share some of the same address values (i.e., address values between 0000 0000h and 0000 FFFFh correspond to locations both in memory address space 30 and in I/O address space 40). As described above, conventional x86-architecture microprocessors present a control signal on a terminal referred to as M/IO#, which at a high logic level indicates that a memory access was to occur, and with a low logic level indicates that an I/O operation was to occur.

As shown in FIG. 3, memory address space 30 includes a non-cacheable area 32. Non-cacheable area 32 corresponds to a region of memory address space 30 that is blocked from being accessed by way of a cache write or a cache read, as described hereinabove. Cacheable access to non-cacheable areas is prevented by memory controller 10, particularly by its control logic 28, according to the contents of certain registers containing the addresses for which cacheable access is to be prevented. Non-cacheable area 32 may include video memory 20v (see FIG. 1), or memory-mapped control registers, neither of which are suitable for cache storage. As such, the contents of non-cacheable area 32 are prevented from being stored in internal caches within CPU 5, such as level 2 cache 6 shown in FIG. 1, through the operation of memory controller 10 and its issuance of a deasserted state on line KEN#.

However, it has been discovered, in connection with the present invention, that it may be useful to provide burst access capability to non-cacheable areas of main memory 20 in x86-architecture microprocessors. For example, CPU 5 may wish to rapidly access (i.e., in a burst mode) the contents of a portion of video memory 20v, in non-cacheable area 32. For example, CPU 5 may wish to copy the screen image into memory, or copy another portion of memory into video memory. Since video memory 20v is non-cacheable, prior art x86-architecture systems would prevent burstable access to non-cacheable area 32.

According to a first preferred embodiment of the invention, however, CPU 5 is able to request burstable but non-cacheable access to main memory 20, through the use of existing control signals in control bus CBUS. As indicated hereinabove, the control output signal M/IO# is used by conventional x86-architecture microprocessors to indicate whether a memory access (M/IO# high) or an I/O operation (M/IO# low) is to be performed. In contrast, according to this embodiment of the invention, the combination of a low logic level on line M/IO# in combination with assertion of the CACHE# signal (with a low logic level) is used by CPU 5 to request a burstable memory access to a non-cacheable area of memory address space 30. Memory controller 10, specifically bus control circuit 25 therein, will interpret this combination of M/IO# low and CACHE# low as a request for a burst memory access (rather than as an I/O request, as would be the interpretation according to the prior art), and will effect a non-cacheable burst memory access to main memory 20 even if control logic 28 indicates that the memory address is within the non-cacheable area 32 of memory address space 30. If CPU 5 presents an address, in combination with M/IO# and CACHE# low, that is within the cacheable area of memory address space 30, a burst access will still be requested and performed; however, CPU 5 will not attempt to cache the access, even though cache access is available for the addressed memory location in this case.

Memory and I/O operations according to this embodiment of the invention may thus be requested by CPU 5, via control signals M/ IO# and CACHE#, according to the following table and the corresponding logic in FIG. 3:

| Operation type | M/IO# | CACHE# |
|---|---|---|
| Burstable, cacheable memory access | 1 | 0 |
| I/O operation (IN or OUT) | 0 | 1 |
| Nonburstable, noncacheable memory access | 1 | 1 |
| Burstable, non-cacheable memory access | 0 | 0 |

This operation is schematically illustrated in FIG. 3 by the portion of bus control circuit 25 used to drive control signals MEN1 for single memory transfer cycle (i.e., non-burstable, non-cacheable), MENBC for burstable, cacheable memory access, IOEN for I/O operation, and MENBNC for burstable, non-cacheable memory access. AND gate 31 drives line MEN1 high only in response to both of lines M/IO# and CACHE# high, AND gate 33 drives line IOEN high only in response to line M/IO# low with line CACHE# high, AND gate 35 drives line MENBC high only in response to line M/IO# high and line CACHE# low, and AND gate 37 drives line MENBNC high only in response to both of lines M/IO# and CACHE# low.

Of course, according to this embodiment of the invention, I/O controller 14 must be configured to not respond to a low logic level on line M/IO# in combination with line CACHE# low, so as to prevent bus conflict due to a burstable non-cacheable memory access occurring simultaneously with an unintended I/O operation.

Figure 4:
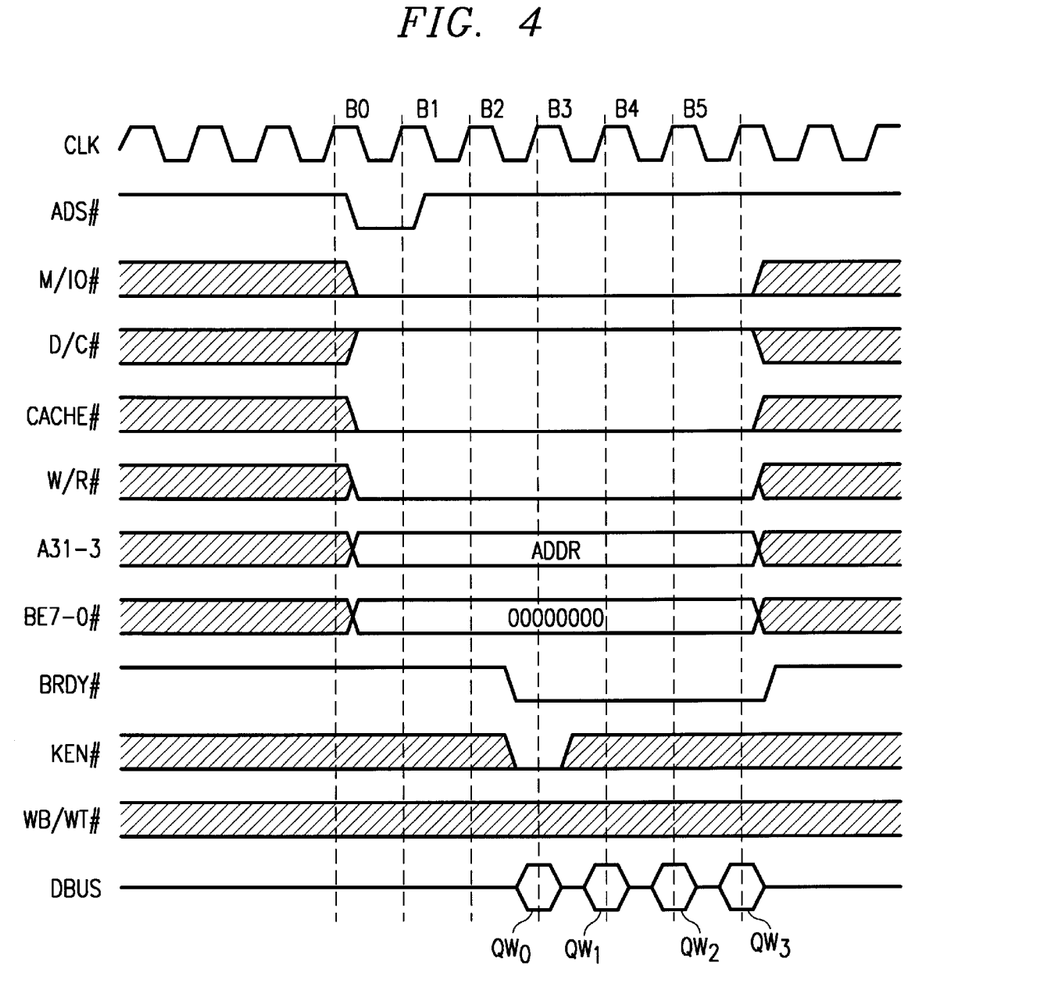
FIGS. 4a and 4b are timing diagrams illustrating the request and performance of a burst read and write, respectively, from non-cacheable memory according to the first preferred embodiment of the invention.

Referring now to FIG. 4a, a timing diagram illustrating the operation of a burstable, non-cacheable memory read, as requested by CPU 5 and effected by main memory 20 and memory controller 10 according to this first preferred embodiment of the invention, will now be described, for purposes of further explanation. In this example, the read memory access is requested by CPU 5 issuing a memory address on address bus lines A31-A3 in combination with a 0 value on byte enable lines BE7#- BE0#; this address is indicated by CPU 5 as valid upon its assertion of a low logic level on line ADS#. In this example of a burstable non-cacheable memory read, the address presented by CPU 5 is within a non-cacheable area 32 of memory address space 30. In combination with the memory address, CPU 5 also issues a high logic level on line D/C# to indicate that this operation is a data operation, and asserts line W/R# low to request a memory read. These signals are conventional for x86-architecture microprocessor read operations. According to this first embodiment of the invention, CPU 5 also presents a low logic level on line M/IO# in combination with a low logic level on line CACHE#. These signals are all present in bus cycle B0 of FIG. 4a.

This combination of signals indicates to memory controller 10 that a burstable access to a non-cacheable area of main memory 20 is being requested. Memory controller 10 responds to this request by issuing the appropriate control signals and addresses to the addressed memory devices in main memory 20. In bus cycle B2 (bus cycle B1 being a wait state), memory controller 10 indicates to CPU 5 that a burstable access to main memory 20 has been granted by asserting line KEN# low, and that data bus DBUS will have valid memory data placed thereupon at the end of the current clock cycle by asserting line BRDY# low. Line WB/WT# is a don't care in this operation, since the memory read is non-cacheable. Valid data, in the form of quad words QW0 through QW3 (each being 64 bits, or eight bytes) then appear upon data bus DBUS at the end of the current bus cycle B2 and the next three successive bus cycles B3 through B5 (assuming no wait states). The burst memory read according to this embodiment of the invention is then indicated as complete, by memory controller driving line BRDY# to a high state, in bus cycle B6. Subsequent memory accesses, of the burstable, non-cacheable type, or of another type, may then be effected in the conventional manner.

Referring now to FIG. 4b, the operation of a burstable, non-cacheable memory write operation will now be described in detail. Similarly as in the case of the memory read of FIG. 4a, CPU 5 initiates the operation with the presentation of the desired address on address lines A31 through A3, and the zero value for byte enable bits BE#, together with a high level on line D/C# at the time that CPU 5 asserts the ADS# signal low in bus cycle WB0. Also in this cycle WB0, CPU 5 indicates that it wishes to perform a memory write by asserting line W/R# high, and requests a burst write to a non-cacheable memory location by asserting line M/IO# low in combination with line CACHE# low. Again, as in the case of the read, if the address points to a cacheable area of memory address space 30, a burst access will be performed but the write will not be effected via cache. In response to this request by CPU 5, memory controller 10 issues (in bus cycle WB2, after a single wait state) a low logic level on line KEN# to indicate that burst access to main memory 20 has been granted, in combination with a low logic level on line BRDY# indicating that valid data is expected at the end of the current bus cycle WB2. CPU 5 then effects the write by placing valid data onto data bus DBUS at the end of bus cycle WB2 and the subsequent three bus cycles WB3 through WB5. The burst write operation is then indicated as complete by memory controller 10 driving line BRDY# in the final bus cycle WB6.

According to this preferred embodiment of the invention, therefore, burstable access is provided to non-cacheable areas of main memory in an x86-architecture microprocessor-based computer system. The benefits of effecting memory operations at burst rates are thus obtained for a wider range of memory operations, particularly in accessing memory locations that are not suitable for cacheability such as video RAM locations. In addition, such access is provided according to this first embodiment of the invention without requiring an additional pin on the microprocessor.

Figure 5:
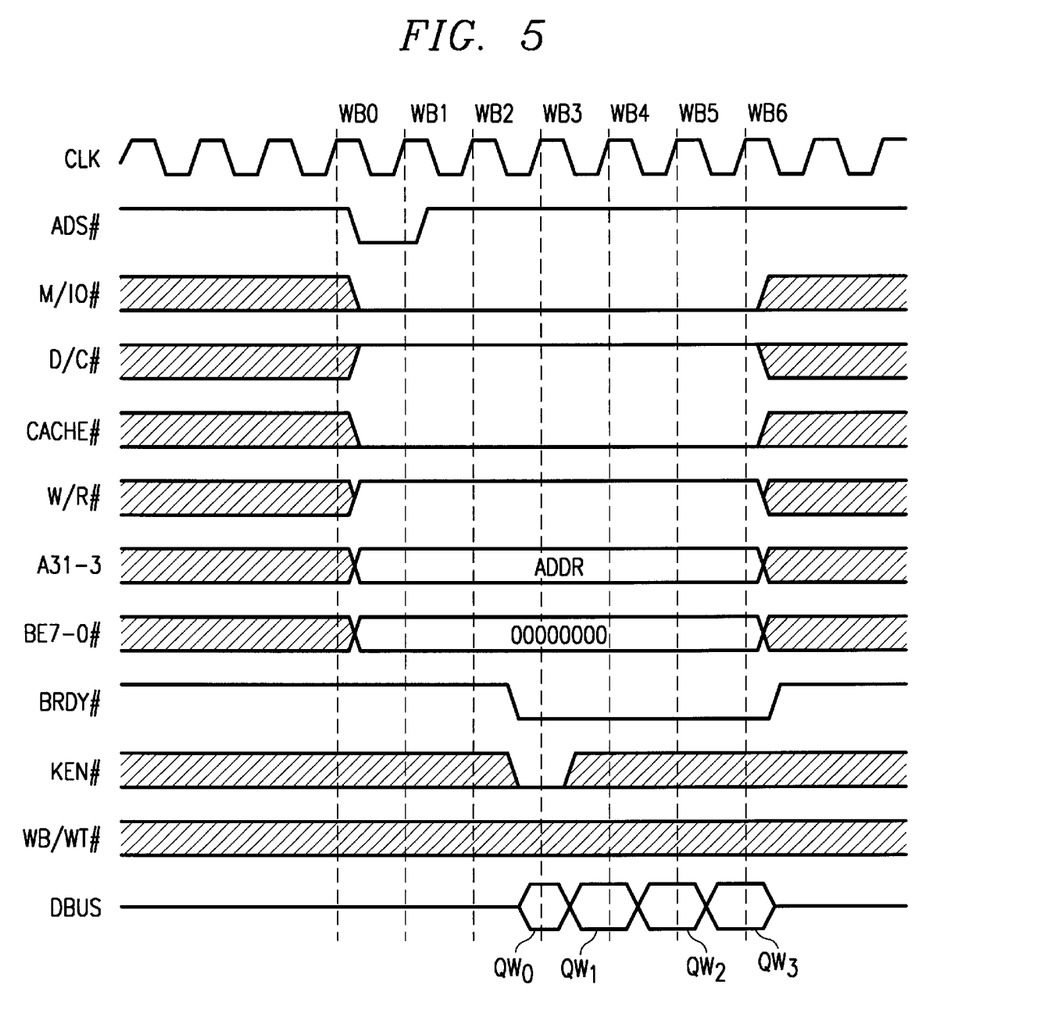
FIG. 5 is an electrical diagram, in block form, of the memory and input/output controller of the system of FIG. 1 according to a second embodiment of the invention.
Figure 6:
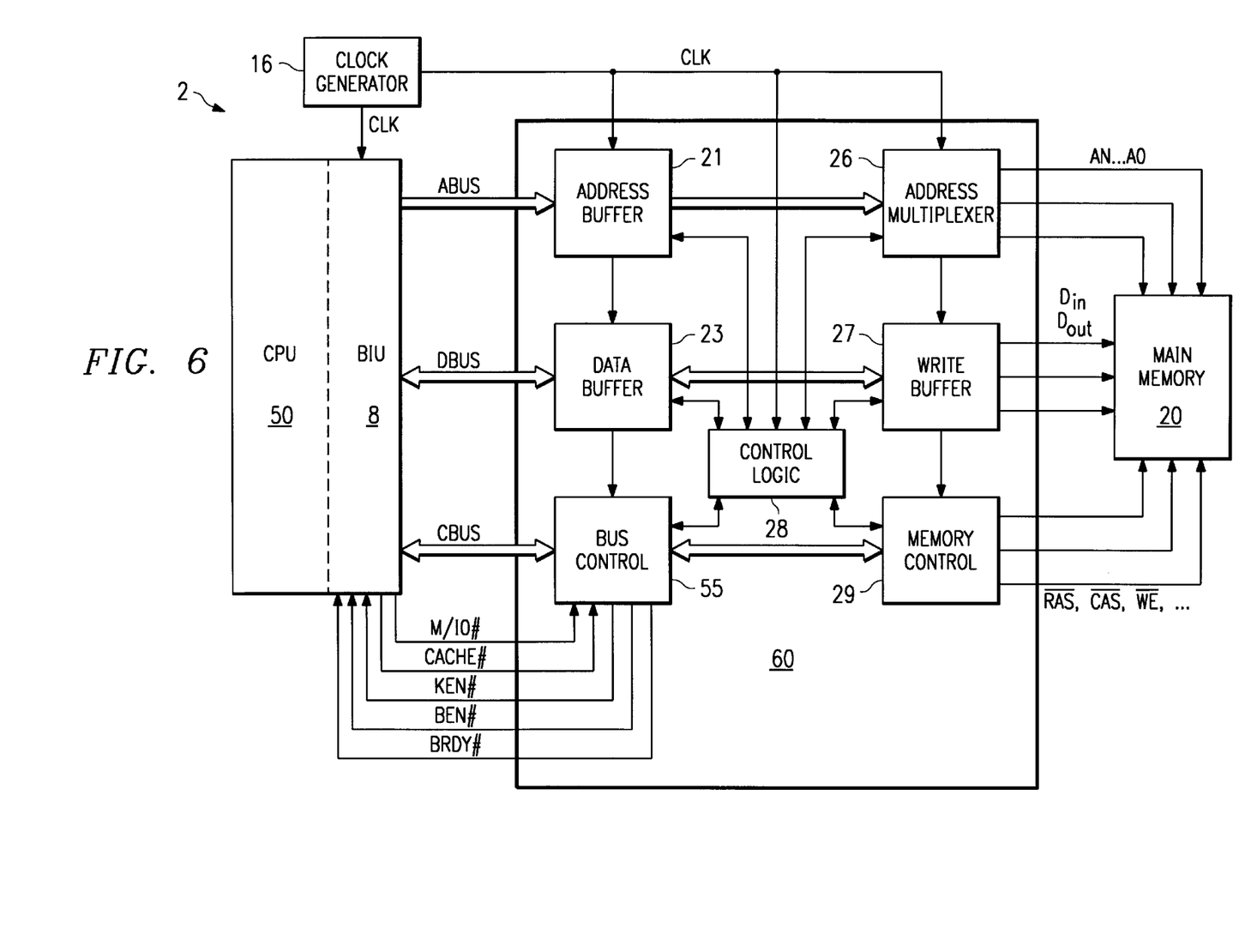

If an additional microprocessor pin and corresponding mother board conductor are available, the present invention may be implemented according to a second embodiment of the invention, as will now be described relative to FIG. 5. In FIG. 5, like reference numerals are used to refer to like elements as shown in FIG. 2.

FIG. 5 illustrates CPU 50, which is also a Pentium-class microprocessor as described hereinabove relative to FIG. 2, but which in this case is configured so that certain types of memory accesses imply a request for burstable access. These requests are communicated (either expressly or implicitly) to bus control logic 55 in memory controller 60, for interpretation as burst memory access requests.

For example, the execution of a block memory access operation by CPU 50, such as a REP MOV set of instructions, may set a control flag in BIU 8 that is communicated to bus control logic 55. In this event, once the control flag is set, bus control logic 55 may then interpret all subsequent memory access requests (line M/IO# high) as requests for burst access, for accesses both to cacheable and also non-cacheable areas of the memory address space. Alternatively, specific instructions may be executable by CPU 50 that explicitly refer to burst memory accesses both to cacheable and non-cacheable areas of memory; a flag or control signal would again be set by CPU 50 to indicate to memory controller 60 that a burst access is requested.

According to this second embodiment of the invention, because burst memory accesses may be requested by CPU 50 both to cacheable and non-cacheable areas of memory, separate indications of cacheability and burstability are preferably given by memory controller 60 to CPU 50. This is because CPU 50 may issue a implied burst access request while not knowing whether the memory address is in a cacheable area of the memory address space; even if the memory access is non-cacheable, burstable access will still be desirable. According to this embodiment of the invention, therefore, burst enable signal BEN# is provided, which is a signal and corresponding CPU terminal provided in this embodiment of the invention, in addition to the conventional Pentium-class control signals and pins. As shown in FIG. 5, according to this embodiment of the invention, bus control logic 55 issues a signal on line KEN# to indicate cacheability of the memory access (similarly as described hereinabove relative to the first embodiment of the invention), and also issues a signal on line BEN# to indicate whether or not burst access was granted. In the event that CPU 50 requested burst access to a non-cacheable memory location, line KEN# will be maintained high by bus control logic 55 (indicating non-cacheable access) and line BEN# will be driven low by bus control logic 55, indicating the grant of burstable access and thus instructing CPU 50 to either present or expect four quad-words of data on data bus DBUS.

It should be noted that, according to this second embodiment of the invention, memory controller 60 could effect a memory access that is cacheable, but not burstable, and communicate the same to CPU 50 (by way of line KEN# low and line BEN# high). However, the usefulness of such a memory access mode is questionable, given that cache fills and writebacks are preferably performed for entire cache lines.

According to all of the embodiments of the invention described hereinabove, therefore, the present invention provides important benefits in improving the memory access performance for certain types of memory locations, particularly such locations as video memory, where burstable access was not available for microprocessors of the x86-architecture. The ability to provide burstable non-cacheable access to memory is provided according to the present invention in a manner that does not require substantial redesign or reconfiguration of the microprocessor-based system, and according to one embodiment of the invention does not even necessitate an additional microprocessor terminal.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A microprocessor-based data processing system, comprising:

a microprocessor, for executing data processing instructions, and connected to a bus with which the microprocessor communicates data, control and address signals, said control signals including an I/O control signal for indicating an input or output operation, a memory access control signal for indicating a memory access, and a burst request signal for indicating a request to access a plurality of addressable memory locations with the presentation of one address value, said microprocessor having a cache memory;

an output device;

an input/output device controller, coupled to the bus and to the output device, for receiving data from the microprocessor for output by the output device responsive to the microprocessor presenting an address value on the bus in combination with the I/O control signal;

a main read/write memory, for storing digital data corresponding to inputs and outputs to and from the microprocessor, said main read/write memory having an address space;

a memory controller, connected to the bus and to the main read/write memory, for controlling access to the main read/write memory responsive to the microprocessor presenting an address value on the bus by the signals in combination with the memory access control signal;

wherein the memory controller prevents cache access to a non-cacheable portion of main memory;

and wherein the memory controller enables a burst memory access to the non-cacheable portion of the main read/write memory responsive to the microprocessor presenting the I/O control signal in combination with the burst request signal.

2. The system of claim 1, wherein the microprocessor is of the x86-architecture type.

3. The system of claim 2, wherein the microprocessor has an M/IO# terminal connected to the bus;

wherein the microprocessor presents the I/O control signal by placing the M/IO# terminal at a first logic level;

and wherein the microprocessor presents the memory access control signal by placing the M/IO# terminal at a second logic level.

4. The system of claim 3, wherein the microprocessor has a CACHE# terminal connected to the bus;

and wherein the microprocessor presents the burst request signal by asserting the CACHE# terminal.

5. The system of claim 1, wherein the non-cacheable portion of the main read/write memory corresponds to video memory.

6. A microprocessor-based data processing system, comprising:

a microprocessor of the x86-architecture type, connected to a bus with which the microprocessor communicates data, control and address signals, said control signals including a memory access control signal for indicating a memory access, and a burst request signal for indicating a request to access a plurality of addressable memory locations with the presentation of one address value, said microprocessor having a cache memory;

a main read/write memory, for storing digital data, said main read/write memory addressable according to an address space including a cacheable and a non-cacheable portion;

a memory controller, connected to the bus and to the main read/write memory, for controlling access to the main read/write memory responsive to the microprocessor presenting an address value on the bus by the signals in combination with the memory access control signal, and for enabling burst access to the non-cacheable portion of the main read/write memory address space responsive to the burst request signal.

7. The system of claim 6, wherein the memory controller prevents cache access to a non-cacheable portion of main memory;

wherein the microprocessor presents an I/O control signal for indicating an input or output operation;

wherein the system further comprises:
an output device; and
an input/output device controller, coupled to the bus and to the output device, for receiving data from the microprocessor for output by the output device responsive to the microprocessor presenting an address value on the bus in combination with the I/O control signal;

and wherein the memory controller enables a burst memory access to the non-cacheable portion of the main read/write memory responsive to the microprocessor presenting the I/O control signal on the bus in combination with the burst request signal.

8. The system of claim 6, wherein the microprocessor has an M/IO# terminal connected to the bus;

wherein the microprocessor presents the I/O control signal by placing the M/IO# terminal at a first logic level;

and wherein the microprocessor presents the memory access control signal by placing the M/IO# terminal at a second logic level.

9. The system of claim 8, wherein the microprocessor has a CACHE# terminal connected to the bus;

and wherein the microprocessor presents the burst request signal by asserting the CACHE# terminal.

10. A method of operating a microprocessor-based system to effect a burst memory access in a microprocessor-based system, wherein the system has a memory address space and an I/O address space, each selectable by the microprocessor by an address value in combination with a select signal for indicating either a memory access request or an I/O access request, wherein the microprocessor has a cache memory, comprising the steps of:

operating the microprocessor to present the select signal indicating an I/O access request in combination with a cache request signal;

operating the microprocessor to present, in combination with the select signal indicating an I/O access request and the cache request signal, a memory address corresponding to a non-cacheable portion of the memory address space; and performing a series of memory accesses in succession responsive to the memory address presented by the microprocessor to the non-cacheable portion of the memory address space.

11. The method of claim 10, wherein the microprocessor is of the x86 architecture type.

12. The method of claim 11, wherein the step of operating the microprocessor to present the select signal indicating an I/O access request comprises presenting a first logic level on an M/IO# terminal of the microprocessor.

13. The method of claim 12, further comprising:
placing a selected logic level at a KEN# terminal coupled to the microprocessor to indicate that burst access is granted.

14. The system of claim 4, wherein: the memory controller enables a burstable and cacheable memory access in response to the M/IO# terminal at the second logic level and the CACHE# terminal being asserted, enables an input/output operation in response to M/IO# terminal at the first logic level and the CACHE# terminal being not asserted, enables a nonburstable and noncacheable memory access in response to M/IO# terminal at the first logic level and the CACHE# terminal being asserted, and enables a burstable and noncacheable memory access in response to M/IO# terminal at the second logic level and the CACHE# terminal being asserted.

15. The system of claim 9, wherein: the memory controller enables a burstable and cacheable memory access in response to the M/IO# terminal at the second logic level and the CACHE# terminal being asserted, enables an input/output operation in response to M/IO# terminal at the first logic level and the CACHE# terminal being not asserted, enables a nonburstable and noncacheable memory access in response to M/IO# terminal at the first logic level and the CACHE# terminal being asserted, and enables a burstable and noncacheable memory access in response to M/IO# terminal at the second logic level and the CACHE# terminal being asserted.

16. The method of claim 12, wherein the step of operating the microprocessor to present the cache request signal comprises presenting a second logic level on a CACHE# terminal or the microprocessor.

17. The method of claim 15, further comprising the steps of:

performing a burstable and cacheable memory access in response to the M/IO# terminal at a third logic level different from the first logic level and the CACHE# terminal at the first logic level;

performing an input/output operation in response to M/IO# terminal at the first logic level and the CACHE# terminal at a fourth logic level different from the second logic level;

performing a nonburstable and noncacheable memory access in response to M/IO# terminal at the first logic level and the CACHE# terminal at the second logic level; and performing a burstable and noncacheable memory access in response to M/IO# terminal at the second logic level and the CACHE# terminal at the first level.

* * * * *

UNITED STATES PATENT AND TRADEMARK OFFICE
CERTIFICATE OF CORRECTION

PATENT NO. : 6,032,225
DATED : February 29, 2000
INVENTOR(S) : Jonathan H. Shiell, et al.

It is certified that error appears in the above-identified patent and that said Letters Patent is hereby corrected as shown below:

Cover Page, insert Item [60] under Related U.S. Application Data

--Provisional Application No. 60/008,799 December 18, 1995.--

Signed and Sealed this

Eighth Day of May, 2001

*Attest:*

NICHOLAS P. GODICI

*Attesting Officer*   *Acting Director of the United States Patent and Trademark Office*